Patented May 8, 1923.

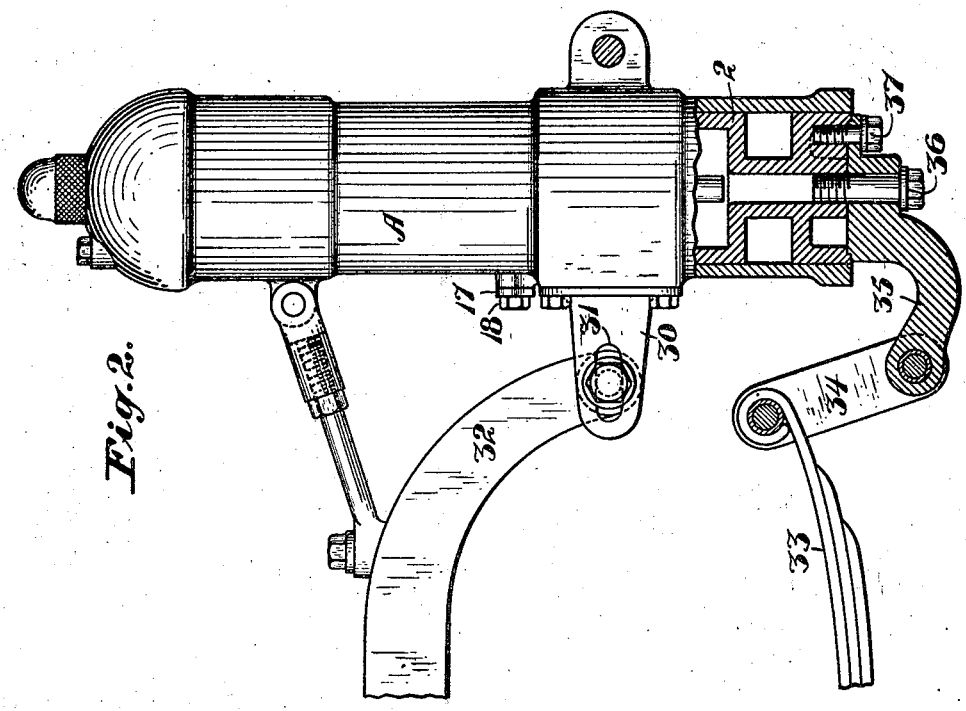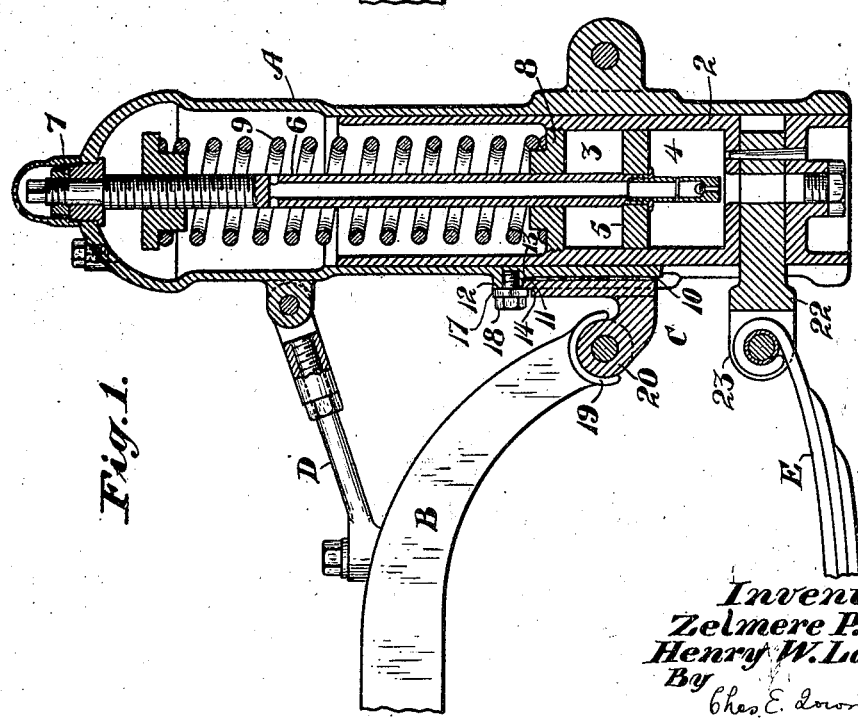

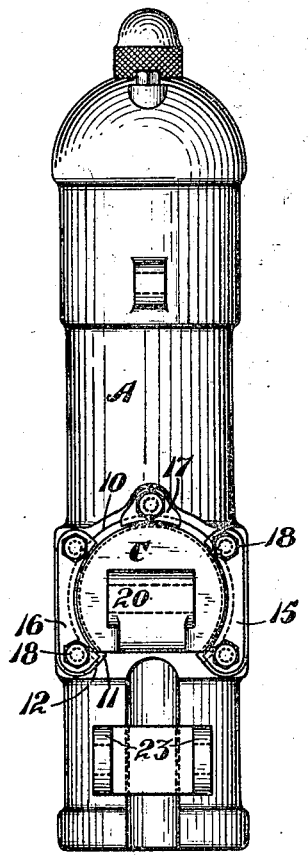
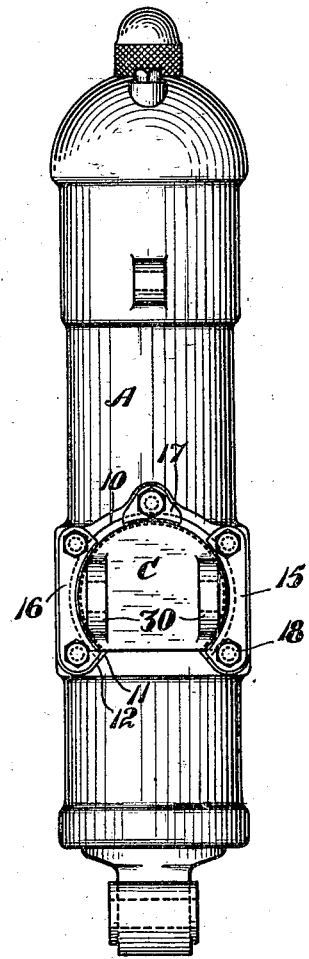
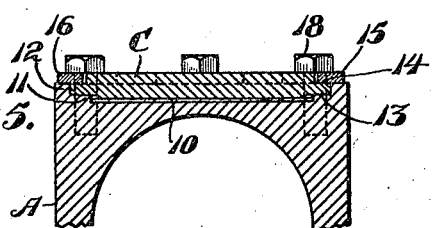

1,454,394

UNITED STATES PATENT OFFICE.

ZELMERE P. LOYD AND HENRY W. LARSSON, OF OAKLAND, CALIFORNIA, ASSIGNORS TO LOYD MFG. CO., OF OAKLAND, CALIFORNIA, A CORPORATION OF CALIFORNIA.

ADJUSTABLE ATTACHING BRACKET.

Application filed December 7, 1921. Serial No. 520,507.

*To all whom it may concern:*

Be it known that we, ZELMERE P. LOYD and HENRY W. LARSSON, citizens of the United States, residing at Oakland, in the county of Alameda and State of California, have invented new and useful Improvements in Adjustable Attaching Brackets, of which the following is a specification.

This invention relates to an air spring or cushioning device for motor vehicles and the like, and especially to an adjustable attaching bracket therefor. Generally speaking the present invention relates to an improvement on the structure disclosed in a copending application entitled "Shock absorber," filed May 11, 1920, Serial No. 468,506. This last named application embodies a shock absorber consisting of a cylinder attached to the main frame of a vehicle, a piston reciprocally mounted therein, which is attached to the spring of a vehicle, an auxiliary cushioning spring interposed between the cylinder and the piston, and a dashpot mechanism for limiting the movement of said auxiliary spring.

There are a number of somewhat similar shock absorbers or cushioning devices manufactured and sold today, and it may be stated that such devices are coming more and more into general use as they materially improve the riding qualities of the average car, regardless of the type of spring mounting employed. Considerable trouble and cost is however encountered when applying such devices to the average car as the shape of the frames and the type of spring mounting employed varies to a considerable extent. In some instances it is necessary to cut the main frame of a car in order to permit the installation of the shock absorbers. In other cases it is necessary to change the spring mounting, and again, in other cases it is necessary to construct special attaching brackets, etc.

The object of the present invention is to overcome the objections referred to by providing a simple, substantial adjustable attaching bracket, that is generally adaptable regardless of the type of shock absorber employed, or whether attachment is made to the front or rear of a car or both; that will permit angular adjustment of the shock absorbers with relation to the main frame; that will permit longitudinal adjustment to compensate for springs of varying length, and that will entirely avoid the necessity of cutting the frames, etc.

Further objects will hereinafter appear.

The invention consists of the parts and the construction, combination and arrangement of parts as hereinafter more fully described and claimed, having reference to the accompanying drawings, in which—

Fig. 1 is a central, vertical sectional view of a shock absorber showing the adjustable bracket whereby connection is made between the cylinder and the front end of the main frame of a vehicle.

Fig. 2 is a side elevation of a shock absorber partially in section showing the bracket employed when the cylinder is attached to the rear end of the main frame of a vehicle.

Fig. 3 is an end view of the shock absorber illustrated in Fig. 1 and the adjustable attaching bracket secured thereto.

Fig. 4 is a similar view of the shock absorber shown in Fig. 2, and said view also showing the adjustable attaching bracket secured thereto.

Fig. 5 is a partial cross section of a cylinder showing the position of the attaching bracket with relation thereto.

For the purpose of clearly describing the construction, use and the function of the adjustable attaching bracket forming the subject matter of the present invention, a brief outline of one form of shock absorber will be made, but it should be understood that the bracket is by no means limited in application to the specific form of shock absorber here shown as it may be applied to a variety of standard forms now in use. The shock absorber illustrated in the present instance forms the subject matter of a copending application already referred to. It consists of a cylinder A, in which is reciprocally mounted a piston 2. The cylinder proper, whether applied to the front or rear end of a car is in practically every instance attached to the main frame and rigidly secured with relation thereto, while the pistons employed are connected with the springs. The piston illustrated in the present instance has a cylinder chamber formed therein which is divided into two compartments such as illustrated at 3 and 4 by means of a piston 5. This piston is secured to a rod 6 rigidly secured to the cylinder at its upper end as at 7, and extends through a head member 8 which closes the upper end of the cylinder chamber just referred to. This cylinder chamber is in reality nothing more or less than a double acting dashpot and it is provided for the purpose of checking excess movement of the main piston 2 with relation to the main cylinder A. The normal load imposed upon the shock absorber is supported by a spring 9 interposed between the cylinder and the head member 8, but as a double acting dashpot is employed, it can readily be seen that excess compression or extension of this spring will be avoided.

This brief description of the construction of the shock absorber has merely been resorted to for the purpose of explaining the operation of the specific form of shock absorber illustrated and will be hereinafter referred to.

The cylinder proper, referring to Fig. 1, is rigidly attached to the front end of the main frame illustrated at B by means of a bracket C and a tie rod generally indicated at D. It happens in certain instances that the frames B are slightly bent or angularly disposed with relation to each other and as it is, practically speaking, essential that the cylinders should assume a perfect vertical position when applied, it is obvious that the frames must be heated and straightened to assume a vertical position, or that some means must be provided for adjusting the bracket C with relation to the cylinder. In fact it might here be stated there is so much labor involved in straightening frames of this character that the usual practice heretofore has been that of cutting off the front end of the frames and applying specially constructed brackets to suit the particular condition involved.

One of the objects of the present invention is to avoid all such excess labor by providing a bracket, such as here illustrated, which is turnable with relation to the cylinders and therefore permits vertical adjustment of the cylinders with relation to the frames. This is accomplished in the following manner:

Formed on the rear side of each cylinder is a substantially circular recess 10. This recess is machined to form a pair of annular offset shoulders, as at 11 and 12, and a bracket, such as shown at C and having an exterior contour similar to that of the recess 10, is also machined to form two faces, as indicated at 13 and 14. The face 13 engages the shoulder or annular face 11, while the face 14 will extend slightly above the surface or face indicated at 12. The annular shoulder or face 12 formed about the recess secures the bracket plate C against lateral and vertical movement with relation to the cylinder, but it permits turning movement of the bracket with relation thereto. To secure the bracket plate against removal and against turning movement when adjustment has been made, a series of clamping plates, such as shown at 15, 16 and 17, are employed. These plates are drawn tightly against the annular face 14 of the bracket plate by means of bolts 18 and thereby clamp and secure the bracket as a whole with relation to the annular seat 11. The front end of most frames is provided with a forked eye such as illustrated at 19 and attachment therewith is made by a lug such as shown at 20, which is formed on the bracket plate. A bolt passed through the lug and the eyes will then complete the connection at this point, while the tie rods indicated at D will complete the other connection between the frame and the cylinder and secure it against pivotal movement in the eye 19. Attachment must also be made between the piston and the spring indicated at E. This is accomplished by attaching a bolt to the lower end of the piston, as shown at 22. This bolt is fork shaped at its outer end, as at 23, and is thus formed to receive the eye of the spring E. The connection is here completed by the insertion of a pin in the usual manner.

From the foregoing it can be seen that the attaching bracket provided in the present instance eliminates the necessity of cutting the front end of the main frame; it eliminates the necessity of twisting or bending the front end of the frame, and it eliminates the use of a special bracket in each instance. The bracket employed and illustrated in the present case will take care of any make or size of car as it permits angular or vertical positioning of each cylinder with relation to the main frame, and thereby takes care of any condition which may be encountered.

Where the cylinders of a shock absorber are attached to the rear end of a car, a slightly different form of attaching bracket is employed. In place of using a lug, such as illustrated at 20, in Figs. 1 and 3, a pair of interspaced, elongated lugs 30 is provided. These lugs are slotted longitudinally, as indicated at 31, and permit longitudinal or endwise adjustment of the cylinders with relation to the rear ends of the main frame, as indicated at 32. Such adjustment is of considerable importance as the length of the springs shown at 33 varies in different makes of cars, that is it is important that the spring shackle 34 shall assume the right position with relation to the lower end of the shock absorbing cylinder.

Another feature is the provision of a detachable bracket such as indicated at 35. This is secured to the lower end of the piston by means of bolts 36 and 37 and is only employed where shackles are required, as shown at 34, otherwise it is possible to make a direct connection between the piston and the spring by means of the fork shaped bolts indicated at 22 and 23.

From the foregoing it can be seen that a standard cylinder and piston may be employed, whether attachment is made with the front or rear of a car. The only change required is in the brackets employed. If attachment is made to the front end of a vehicle, the bracket C is employed. If attachment is made with the rear end of a vehicle, a bracket such as illustrated in Figs. 2 and 4, is employed. Again, where a shackle connection is interposed between the spring and the piston, an attaching bracket, such as shown at 35, is employed, and when a direct connection is made between the piston and the spring, a bolt such as indicated at 22 is employed. In other words the only parts of the mechanism requiring change are the brackets disclosed, and as these are standard and may be applied to any car regardless of make or varying conditions encountered, it can be seen that standard equipment may be employed throughout.

While certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or varying uses may demand.

Having thus described our invention, what we claim and desire to secure by Letters Patent is—

1. In a shock absorber of the character described a cylinder, a shouldered recess on one side of the cylinder, a plate turnably mounted with relation thereto, means for securing the plate to the shouldered recess and for locking the plate against turning movement, and a lug formed on said plate.

2. In a shock absorber of the character described a cylinder, a shouldered recess formed on one side thereof, a plate of similar shape adapted to fit the shouldered recess and engage the same, said plate being secured against lateral and vertical movement by said shoulder, but said plate being turnable with relation to the shoulder, a plurality of clamping plates engageable with the plate, said clamping plates adapted to secure the first named plate against endwise movement and turning movement with relation to the cylinder, and a lug on said first named plate.

3. In a shock absorber of the character described, the combination with the main frame of a vehicle and the cylinder of the shock absorber, a substantially annular shoulder formed on the cylinder, a plate turnably mounted on the shoulder, means for locking the plate against movement and means for attaching the plate to the main frame.

4. In a shock absorber of the character described the combination with the main frame of a vehicle and the cylinder of the shock absorber, a bracket supporting said cylinder, said bracket permitting the cylinder to be adjusted with relation thereto, means for holding the cylinder in its adjusted position, and additional adjustable means for bracing the cylinder from the main frame.

ZELMERE P. LOYD.
HENRY W. LARSSON.